Oct. 10, 1950            J. R. PARSONS            2,524,925

PHASE SHIFT CONTROL

Filed April 15, 1949

WITNESSES:

Edward Michaels

Nw. C. Groove

INVENTOR

John R. Parsons.

BY Hymen Diamond.

ATTORNEY

Patented Oct. 10, 1950

2,524,925

UNITED STATES PATENT OFFICE 2,524,925

PHASE SHIFT CONTROL

John R. Parsons, Kenmore, N. Y., assignor to Westinghouse Electric Corporation, East Pittsburgh, Pa., a corporation of Pennsylvania Application April 15, 1949, Serial No. 87,713

12 Claims. (Cl. 315—271)

1

The present invention relates generally to control circuits for gaseous conduction devices, and more particularly to simplified systems of obtaining phase shift voltage control of current in thyratron and other gaseous conduction tube circuits.

It is common in the art relating to control of current by means of thyratron and similar grid controlled gaseous conduction tubes, to utilize phase shifted A.-C. voltage applied to the grids of the tubes for varying the firing times of the tubes, and therefore the average current flow through the tubes. In systems of this character the excitation circuits for the grids of the tubes comprise phase shifting circuits capable of adjustment over a wide range of values, to enable continuous control of the tubes from full-on condition to full-off condition.

Modifications of the basic system above described are well known in which control by means of phase shifted A.-C. voltage applied to the control electrodes of thyratrons or similar gaseous conduction devices is accomplished by superimposing on the phase shifted A.-C. voltage a D.-C. voltage of variable magnitude, the latter serving, for any predetermined phase of the A.-C. voltage, to further vary firing times.

It is an object of the present invention to provide a novel system for control of firing times of grid controlled gaseous conduction tubes which does not require the use of phase shifted A.-C. voltage on the grids.

It is a further object of the present invention to provide a novel system of control of firing times of grid controlled gaseous conduction valves wherein firing times are controlled by means of recurrent D.-C. pulses of variable magnitude.

An ancillary object of my invention is to provide apparatus for supplying currents for different durations through a load.

In accordance with a feature of the invention, control firing times of one or more thyratrons or other gaseous conduction valves are effected by applying to the control electrode of each of the thyratrons a voltage derived by charging a condenser, via a rectifier, from an A.-C. voltage simultaneously applied to the anode of the thyratron, the condenser being connected between grid and cathode of the thyratron and the rectifier being so poled as to charge the condenser in proper polarity to apply negative bias to the grid. The condenser is charged during the negatively increasing portion of a half cycle of charging voltage, and while the anode of the thyratron is negative. Discharge then takes place relatively

2 slowly for the remaining 90° of the half cycle, and for the succeeding half cycle while the anode of the thyratron is positive, being substantially complete at the end of the cycle.

The condenser does not, in one condition of operation, lose sufficient potential by discharge to enable firing of the thyratron at any point in the cycle of applied anode voltage.

However, a D.-C. potential of adjustable magnitude and positive polarity may be applied to the control electrode circuit of the thyratron, in series with the pulsating negative potential provided by the condenser.

The total or resultant bias on the control electrode, then crosses the critical voltage characteristic of the thyratron, at a point during condenser discharge which is determined by the magnitude of the D.-C. potential, initiating firing of the thyratron. As the D.-C. potential is progressively increased, the time of firing is progressively advanced, and control of firing time is feasible from a fully-off condition to a fully-on condition.

In accordance with a further feature of the invention, by controlling the shape of the discharge curve of the condenser, as by varying the discharge resistor, the curve of condenser discharge voltage may be caused to cut the critical grid voltage characteristic of the thyratron at any desired angle.

The above and still further features, advantages, capabilities and objectives of the invention will be clarified upon consideration of the following detailed description of a specific embodiment of the invention, especially when taken in conjunction with the appended drawing, wherein.

Figure 1:
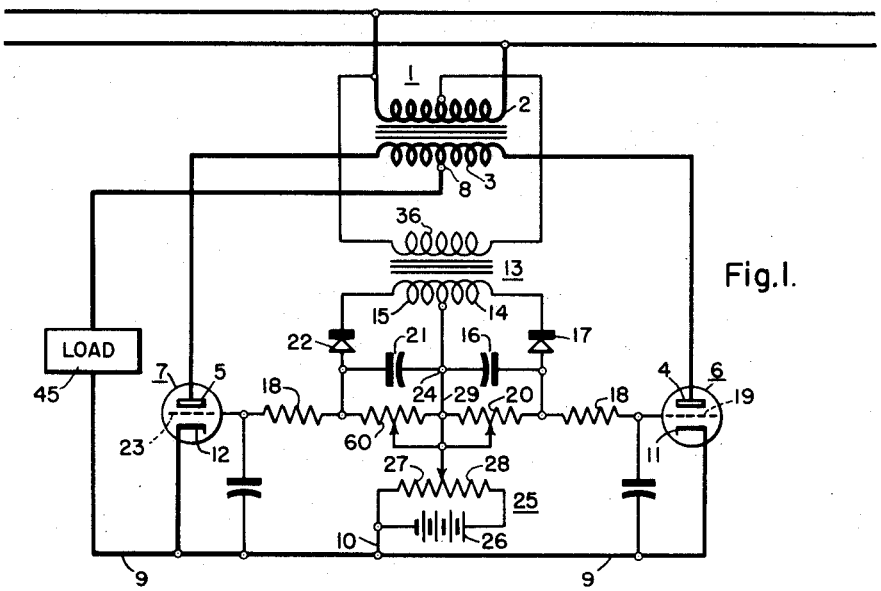
Figure 1 is a schematic circuit diagram illustrating an application of the invention.

Referring now more specifically to the drawing, the reference numeral 1 denotes a power transformer having a primary winding 2 and a center tapped secondary winding 3, opposite ends of which are connected respectively to the anodes 4 and 5 of thyratron tubes 6 and 7. The center tap 8 of the secondary winding 3 is connected via the load 45 and leads 9 and 10 commonly to the cathodes 11 and 12 of the thyratrons 6 and 7.

It is well known in the art that thyratron tubes are unidirectional devices, that is, that they conduct only while their anodes are positive with respect to their cathodes. It is further well known that firing of a thyratron tube may be prevented, while the anode thereof is positive, by application to the control electrode thereof of a voltage algebraically less than a predetermined critical value, the latter depending upon the magnitude of the anode voltage. Once current flow has been initiated between the anode and cathode, the control electrode is no longer capable of controlling the magnitude of the current flowing in the output circuit of the thyratron, and consequently such flow can be stopped only by interrupting the anode circuit or by reducing the anode voltage to zero. The total current flow through a thyratron tube is, accordingly, generally controlled by controlling the time at which a sufficiently positive voltage is applied to the control electrode thereof to enable firing of the tube, conduction then continuing while the anode thereof remains positive, with alternating current supply. Accordingly, firing may be initiated during that half cycle of the supply when the anode of the thyratron is positive with respect to the cathode, and at any desired instant within that half cycle, by applying to the control electrode of the thyratron, at the desired instant, a voltage exceeding the critical value.

In accordance with the present invention, voltage is derived from the primary winding 2 of the transformer 1 via leads 11, this voltage being applied to the primary winding 36 of a transformer 13 having a pair of secondary windings 14 and 15.

The voltage developed from the secondary winding 14 is utilized to charge a condenser 16 via a rectifier unit 17, the negatively charged plate of the condenser 16 being connected, via a protective resistor 18, to the control electrode 19 of the thyratron 6. Connected across the condenser 16 is a variable resistor 20, which serves to discharge the condenser 16. The transformer secondary winding 14 is so phased with respect to the secondary winding 3 of the transformer 1, and the rectifier unit 17 is so poled, that the condenser 16 acquires its negative potential, as seen from the grid 19 of the thyratron 6, during the first 90° of the negative half cycle of voltage applied to the anode 4 of the thyratron 6. Accordingly, the condenser 16 acquires its maximum negative voltage, as seen from the control electrode 19, when the anode 4 of the thyratron 6 is at its maximum negative potential. Thereafter, as the negative voltage supplied by the transformer 14 decreases, the charge established on the condenser 16 cannot leak off via the rectifier unit 17, but is forced to discharge through the variable resistor 20. The time constant of the resistor 20 is established to have a magnitude of the order of one cycle of the voltage supply, so that the condenser 16 is not fully discharged at the termination of each cycle but maintains at all times a negative bias on the control electrode 19 of the thyratron 6 sufficiently great to prevent firing of the thyratron 6.

A similar voltage is established on the condenser 21 by the secondary winding 15 of the transformer 13 via the rectifier unit 22 connected in series between the secondary winding 15 and the condenser 21. The polarity of the voltage established on the condenser 21 as seen from the control electrode 23 of the thyratron 7 is negative, and is maintained of sufficient magnitude to prevent firing of the thyratron 7, during the discharge period of the condenser 21, by connecting a variable resistor 60 across the condenser 21 and in series with the control electrode 23, the resistor 60 having a sufficient magnitude to establish the required time constant for discharge of the condenser 21. The resistors 20 and 60 may be set at different magnitudes so that the condensers 16 and 21 may be discharged at different rates.

Accordingly, the thyratrons 6 and 7 are normally non-conductive.

Connected between the junction point 24 of the condensers 16 and 21 and the commonly joined cathodes 11 and 12 of the thyratrons 6 and 7 is a source of variable voltage, generally denoted by the reference numeral 25, and which, in accordance with one specific example of the present invention, may comprise a battery 26 or other convenient D.-C. source of potential, across which is connected a potentiometer 27 having a variable tap 28, the tap 28 being connected via the lead 29 to the junction point 24. Thereby, the variable voltage available across the potentiometer 27 is connected in series with each of control electrodes 19 and 23 of thyratrons 6 and 7, and in series likewise with each of the bias generating resistors 20 and 60 which establish the normal bias for the thyratrons 6 and 7 in response to the charge on condensers 16 and 21, respectively. The polarity of the voltage provided by the potentiometer 25 is positive with respect to the cathodes 11 and 12 of the thyratrons 6 and 7, and accordingly serves to counter-balance the negative potentials applied to the control electrodes 19 and 23 by the discharge resistors 20, 60, or by the condensers 16 and 21, so that as the condensers 16 and 21, respectively, discharge, gradually reducing the negative potentials applied to the control electrodes 19 and 23, the critical grid characteristic of the thyratron is crossed at a time which may be earlier or later depending on whether the magnitude of the D.-C. bias produced by the potentiometer 25 is greater or less. If the resistors 20 and 60 are set at different magnitudes, the critical grid potential of the two thyratrons 6 and 7 are exceeded at different instants in the half periods of the supply.

Figure 2:
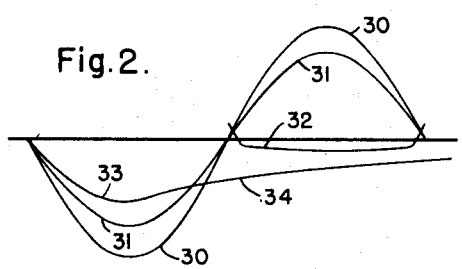
Figure 2 is a graph of voltages corresponding with the fully-off condition of the system of Fig. 1.

Referring now more particularly to Fig. 2 of the drawing, there is illustrated a graph of the time variation of the voltages applied to various elements of either of the thyratrons 6 and 7. Considering the operation of thyratron 6 as exemplary, reference numeral 30 presents the voltage applied to the anode 4 of the thyratron 6, the curve 31 then representing the voltage supplied by the secondary winding 14 of the transformer 13. The curve 32 represents the critical grid voltage, which must be applied to the control electrode 19 if the thyratron 6 is to fire. Curve segment 33 represents the charging curve of the condenser 16, potential being plotted as seen from the control electrode 19, and being accordingly negative. The negative potential 33 is seen to increase so long as the charging voltage 31 increases, and in response to the later voltage. After the charging voltage 31 has reached its negative peak and commences to decrease in magnitude, the charge on the condenser 16 is trapped by the rectifier unit 17 and can discharge only via the resistor 20, and, accordingly, the potential across the condenser 16 becomes independent of the voltage of the secondary winding 14 and decays in accordance with a normal logarithmic decay law at a rate determined by the product of the resistor 60 and the capacity of the condenser 16. These values may be so selected that the voltage 34 does not intersect the critical grid potential line 32 at any point in the cycle of operation, as illustrated in Fig. 2 of the drawing, and, accordingly, so that the thyratron does not fire at any point in its voltage cycle.

Figure 3:
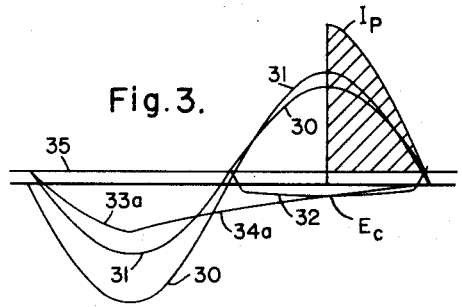
Fig. 3 is a further graph of voltages and current corresponding with 50% on condition of the system of Fig. 1.

Turning now to Fig. 3 of the drawing, conditions are identical with those previously explained in connection with the explanation of the graph of Fig. 2 of the drawing, except that a D.-C. bias 35 is established, by potentiometer 25, which is positive as seen from the control electrode 19. The alternations of the A.-C. grid voltage 31 now take place about the bias line 35, as a base, and the condenser charging graph 33a is now similar to, but positively displaced, from the charging line 33 of Fig. 2 of the drawing. The discharge line 34a of Fig. 3 likewise is parallel to but positively displaced from the discharge line 34 in Fig. 2 of the drawing, and as is evident from a perusal of Fig. 3 of the drawing, cuts the critical grid voltage graph $E_c$ substantially at its mid-point, resulting in firing of the thyratron 6 at the point of cross-over, and consequent flow of current $I_p$ for the remainder, following the instant of cross-over, of the half cycle of positive voltage applied to the anode 4 of the thyratron 6.

Figure 4:
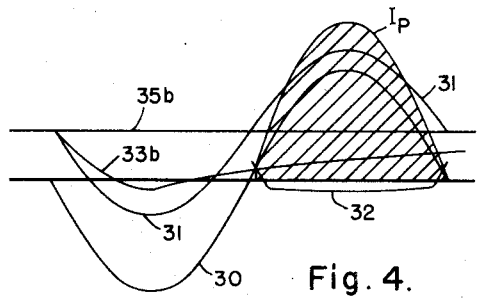
Fig. 4 is still a further graph of voltages and current illustrating conditions in the system of Fig. 1 during fully-on condition.

In Fig. 4 is illustrated operating conditions for a still higher bias 35b than that established in the operation illustrated in Fig. 3 of the drawing, the discharge line 33b of the condenser 16 now crossing over the critical voltage line $E_c$ at or prior to establishment of a positive potential on the anode 4 of the thyratron 6. Accordingly, as soon as the anode 4 becomes positive, the critical grid voltage $E_c$ being exceeded, the thyratron 6 fires, and conducts current throughout the entire half cycle of positive potential. Any intermediate firing time may obviously be established by suitable positioning of the variable contact 28 of potentiometer 25, to establish an intermediate value of D.-C. bias potential.

It will further be obvious, while I have disclosed a potentiometer 25 as a means for introducing positive bias in series with the control electrodes of the thyratrons 6 and 7, that various other modes of so developing bias voltage may be utilized, in accordance with practices well known in the art, and in particular that electronic bias control means may be applied if desired. It will further be clear, while I have disclosed the invention as applied to a pair of thyratrons, that more than two thyratrons may be employed, which may be controlled simultaneously in response to a single bias voltage, or independently in response to separate bias voltages. It is still further clear that while I have disclosed the invention as applied to thyratron tubes having but a single control electrode, various types of gaseous conduction control electrode controlled valves may be utilized instead, without departing from the true spirit and scope of the invention.

Further, while I have disclosed a system wherein the charge on condensers 16 and 21 is negative as viewed from the control electrodes of the controlled thyratrons the bias source 25 supplying, then, a positive bias potential, it is feasible in accordance with an aspect of my invention to reverse the polarity of the charge on the condensers, reversing at the same time the polarity of the potential supplied by bias source 25. In consequence the controlled thyratrons will be rendered conductive fully when the bias source 25 is of sufficient magnitude.

In accordance with the preferred practice of my invention, it is, further, essential that the A.-C. voltage supplied by secondary windings 14 and 15 be in phase, respectively, with the voltages applied to respective anodes 4 and 5 of thyratrons 6 and 7.

However, in the practice of certain aspects of my invention (for example with tubes having positive initial potentials), the voltages supplied by the windings 14 and 15 may be displaced in phase with reference to the anode voltage.

Further variations in arrangement of systems disposed in accordance with the spirit of the present invention may be resorted to, without departing from the true scope thereof.

I claim as my invention:

1. In combination, a control electrode controlled gaseous conduction valve comprising an anode and a cathode, a source of alternating voltage impressed between said anode and said cathode, a condenser connected to said control electrode, means for charging said condenser to a predetermined direct potential, said potential being such as to cause said control electrode to be more positive in the respect to said cathode, means for discharging said condenser to reduce said potential progressively, and means for superimposing between said cathode and said capacitor a direct voltage of constant magnitude, said last named means being so connected that it tends to cause said valve to be non-conductive.

2. In combination, a gaseous conduction valve having an anode, a cathode and a control electrode, a source of alternating voltage, means for impressing said alternating voltage in a first predetermined phase between said anode and said cathode, means for providing a further alternating voltage, co-phasal with said alternating voltage, terminals for impressing a source of voltage connected to said cathode a condenser connected between said control electrode and said one of said terminals, a rectifier connected in series with said condenser, means for applying said further alternating voltage to charge said condenser via said rectifier, said rectifier being poled to charge said condenser with negative polarity as viewed from said control electrode, and means for progressively discharging said condenser substantially to zero potential during each cycle of said further alternating voltage.

3. In combination, a gaseous conduction valve having an anode, a cathode and a control electrode, a source of alternating voltage, means for impressing said alternating voltage in a first predetermined phase between said anode and said cathode, a source of further alternating voltage, of the same frequency as and co-phasal with said alternating voltage, terminals for impressing a source of voltage connected to said cathode a condenser having a first terminal connected to said control electrode and a second terminal connected to said one of said terminals a rectifier, means for applying said further alternating voltage to said condenser via said rectifier, said rectifier poled to charge said condenser with said first terminal negative, a resistor shunted across said condenser for discharging said condenser, the time constant of said resistor and condenser being of the order of the period of said alternating voltage.

4. In combination, a gaseous conduction valve having a anode, a cathode and a control electrode, a source of alternating voltage, means for impressing said alternating voltage in a first predetermined phase between said anode and said cathode, a source of further alternating voltage, of the same frequency as and co-phasal with said alternating voltage, a condenser having a first terminal connected to said control electrode and a second terminal connected to said cathode, a rectifier, means for applying said further alternating voltage to said condenser via said rectifier, said rectifier poled to charge said condenser with said first terminal negative, a resistor shunted across said condenser for discharging said condenser, the time constant of said resistor and condenser being of the order of the period of each alternating voltage, and means for interposing in series with said resistor between said control electrode and said cathode a direct potential of controllable magnitude.

5. In combination, a gaseous conduction valve having an anode, a cathode and a control electrode, a source of alternating voltage, means for impressing said alternating voltage in a first predetermined phase between said anode and said cathode, a source of further alternating voltage, of the same frequency as and co-phasal with said alternating voltage, a condenser having a first terminal connected to said control electrode and a second terminal connected to said cathode, a rectifier, means for applying said further alternating voltage to said condenser via said rectifier, said rectifier poled to charge said condenser with said first terminal negative, a resistor shunted across said condenser for discharging said condenser, the time constant of said resistor and condenser being of the order of the period of each alternating voltage, and means for interposing in series with said resistor between said control electrode and said cathode a direct potential of controllable mangitude, said resistor being variable in magnitude to vary the slope of current discharge with time of said condenser.

6. In combination, a gaseous conduction valve having an anode, a cathode and a control electrode, said valve requiring at least transiently a potential from said control electrode to said cathode having a magnitude algebraically greater than a predetermined value, while said anode is positively poled with respect to said cathode, for rendering said valve conductive, a source of alternating voltage, means for impressing said alternating voltage between said anode and said cathode, terminals for impressing a source of voltage connected to said cathode a condenser connected between said control electrode and said one of said terminals, means for charging said condenser in response to said alternating voltage, during a first half cycle of said alternating voltage in which said cathode is electronegative with respect to said anode, to a potential sufficiently negative to maintain said valve nonconductive, means for progressively discharging said condenser to a potential equal to said predetermined value at a controllable instant of time during the next succeeding half cycle of said alternating voltage.

7. In combination, a gaseous conduction valve having an anode, a cathode and a control electrode, said valve requiring at least transiently a firing potential from said control electrode to said cathode having a magnitude algebraically greater than a predetermined value, while said anode is positively poled with respect to said cathode, means for providing said firing potential comprising a condenser, means for periodically charging said condenser, means for periodically discharging said condenser at a predetermined rate while said anode is positively poled with respect to said cathode, a source of D.-C. control potential, and means for connecting said condenser and said source in series between said control electrode and said cathode, the negative side of said capacitor being connected to said control electrode.

8. In combination, a gaseous conduction valve having an anode, a cathode and a control electrode, said valve requiring at least transiently a firing potential from said control electrode to said cathode having a magnitude algebraically greater than a predetermined value, while said anode is electrically positive with respect to said cathode, and means for providing said firing potential comprising means for generating a voltage varying continuously in magnitude in a predetermined sense only, and means for impressing a constant potential which is algebraically less than said predetermined value, while said anode is electrically positive with respect to said cathode.

9. In combination, a gaseous conduction valve having an anode, a cathode and a control electrode, said valve requiring at least transiently a firing potential from said control electrode to said cathode having a magnitude algebraically greater than a predetermined value, while said anode is electrically positive with respect to said cathode, means for providing said firing potential comprising means for generating a voltage varying continuously in magnitude in a predetermined sense only, and means for impressing a constant potential which is algebraically less than said predetermined value, while said anode is electrically positive with respect to said cathode, and means for varying the average magnitude of said voltage.

10. In combination, a gaseous conduction valve having an anode, a cathode and a control electrode, said valve requiring at least transiently a firing potential from said control electrode to said cathode having a magnitude algebraically greater than a predetermined value, while said anode is electrically positive with respect to said cathode, means for providing said firing potential comprising means for generating a voltage varying continuously in magnitude in a predetermined sense only, and means for impressing a constant potential which is algebraically less than said predetermined value, while said anode is electrically positive with respect to said cathode, and means for varying the rate of change of said magnitude.

11. In combination, a gaseous conduction valve having an anode, a cathode and a control electrode, said valve requiring at least transiently a firing potential from said control electrode to said cathode having a magnitude algebraically greater than a predetermined value, while said anode is electrically positive with respect to said cathode, means for providing said firing potential comprising means for generating a voltage varying continuously in magnitude in a predetermined sense only, while said anode is electrically positive with respect to said cathode, means for manually varying the average magnitude of said voltage, and means for controlling the rate of change of said magnitude, said change in magnitude being such as to tend attaining a value algebraically greater than said predetermined value.

12. In combination, a plurality of control electrode controlled gaseous conduction valves comprising each an anode, a cathode, and a control electrode, a source of alternating voltage, means for impressing said voltage between said anodes and said cathodes, a condenser connected between said control electrode and said cathode of each of said valves, means for charging each of said condensers to a predetermined direct potential of such polarity that said potential tends to cause said control electrodes to be positive with respect to said cathodes, means discharging each of said condensers to reduce said potentials progressively, each of said last named means comprising an independently variable resistor, and means for connecting in series with each of said potentials a D.-C. voltage of constant adjustable magnitude.

JOHN R. PARSONS.

REFERENCES CITED

The following references are of record in the file of this patent:

UNITED STATES PATENTS

| Number | Name | Date |
|---|---|---|
| 2,002,281 | Stansbury | May 21, 1935 |
| 2,003,992 | Cockrell | June 4, 1935 |
| 2,173,921 | Stansbury | Sept. 26, 1939 |
| 2,259,289 | Blumentritt | Oct. 14, 1941 |
| 2,406,853 | Richardson et al. | Sept. 3, 1946 |

FOREIGN PATENTS

| Number | Country | Date |
|---|---|---|
| 473,889 | Great Britain | Oct. 18, 1937 |